United States Patent [19]

Hunahata et al.

[11] Patent Number: 4,838,655
[45] Date of Patent: Jun. 13, 1989

[54] PROJECTOR USING GUEST-HOST LIQUID CRYSTAL CELLS FOR IMPROVED COLOR PURITY

[75] Inventors: Katuyuki Hunahata; Yoshiharu Nagae, both of Hitachi; Masahiro Takasaka, Hitachioota; Yuji Mori, Hitachi; Minoru Hoshino, Hitachi; Yasuyuki Kozima, Hitachi; Youhei Saito, Katsuta; Kyohei Fukuda, Fujisawa; Hayao Kozai, Mobara; Tadahiko Hasimoto, Katsuta; Yoshiaki Tsuchihashi, Kodaira, all of Japan

[73] Assignee: Hitachi, Ltd., Tokyo, Japan

[21] Appl. No.: 141,144

[22] Filed: Jan. 6, 1988

[30] Foreign Application Priority Data

Jan. 9, 1987 [JP] Japan ................................ 62-1636

[51] Int. Cl.$^4$ ............................................. G02F 1/13
[52] U.S. Cl. .................................... 350/335; 350/337; 350/339 F; 350/349; 353/20; 353/25; 353/31; 353/122
[58] Field of Search ............... 350/335, 339 F, 337, 350/349; 353/20, 25, 23, 31, 33, 34, 97, 122

[56] References Cited

U.S. PATENT DOCUMENTS 3,703,329 11/1972 Castellano .................. 350/335 X
4,241,339 12/1980 Ushiyama .................... 350/335 X
4,613,207 9/1986 Fergason ..................... 350/339 FX

FOREIGN PATENT DOCUMENTS 60-169827 9/1985 Japan .

OTHER PUBLICATIONS

Vatne, R. et al., "A LC/CRT Field-Sequential Color Display," *SID 83 Digest* pp. 28-29 (1983).
Aruga, S. et al., "High-Resolution Full-Color Video Projector with Poly-Si TFT Array Light Valves," *SID 87 Digest*, pp. 75-78 (1987).
Bos, P. et al., "A Full-Color Field Sequential Color Display," *Eurodisplay Research Conf. '84 Proceedings*, pp. 7-9.
"Technological Development of Liquid Crystal Color Display Devices," vol. 38, No. 4 of Jour. of the Institute of Television Engineers of Japan, pp. 340-345.

*Primary Examiner*—Stanley D. Miller
*Assistant Examiner*—Richard Gallivan
*Attorney, Agent, or Firm*—Antonelli, Terry & Wands

[57] ABSTRACT

The disclosure relates to a projector having an arrangement of polarizers and liquid crystal cells aligned on the axis of light in the order a first color polarizer colored in red, a first twisted nematic liquid crystal cell, a second twisted nematic liquid crystal cell, a second color polarizer colored in a green, a third twisted nematic liquid, a neutral polarizer and Guest-Host type colored in blue. Since, according to this, a polarizer having inferior color characteristics can be replaced by a Guest-Host type liquid crystal cell, the excitation purity and the scope of color reproduction are improved. Further, since the mixture of color is additive, the brightness of the reproduced color is also much improved.

17 Claims, 11 Drawing Sheets

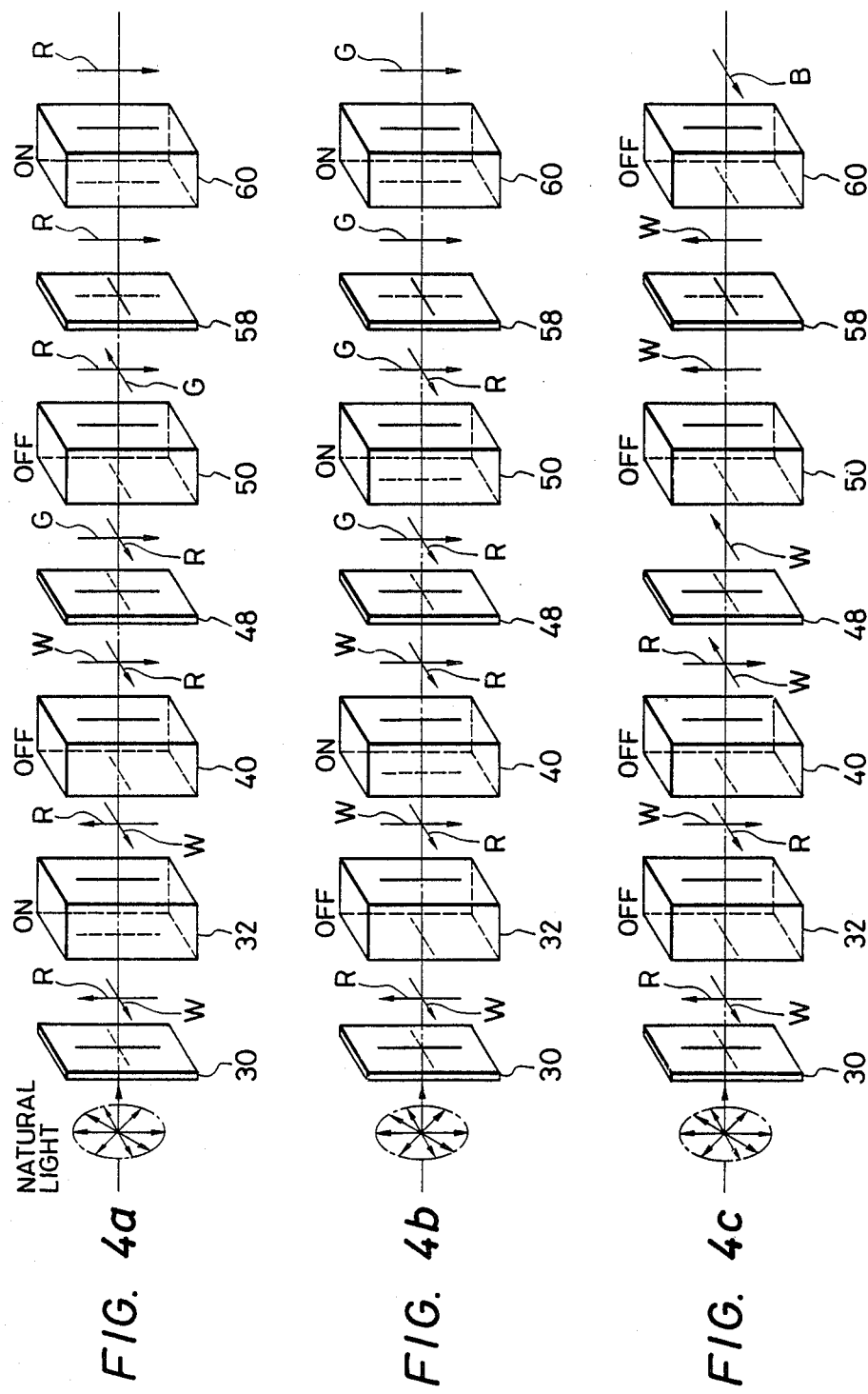

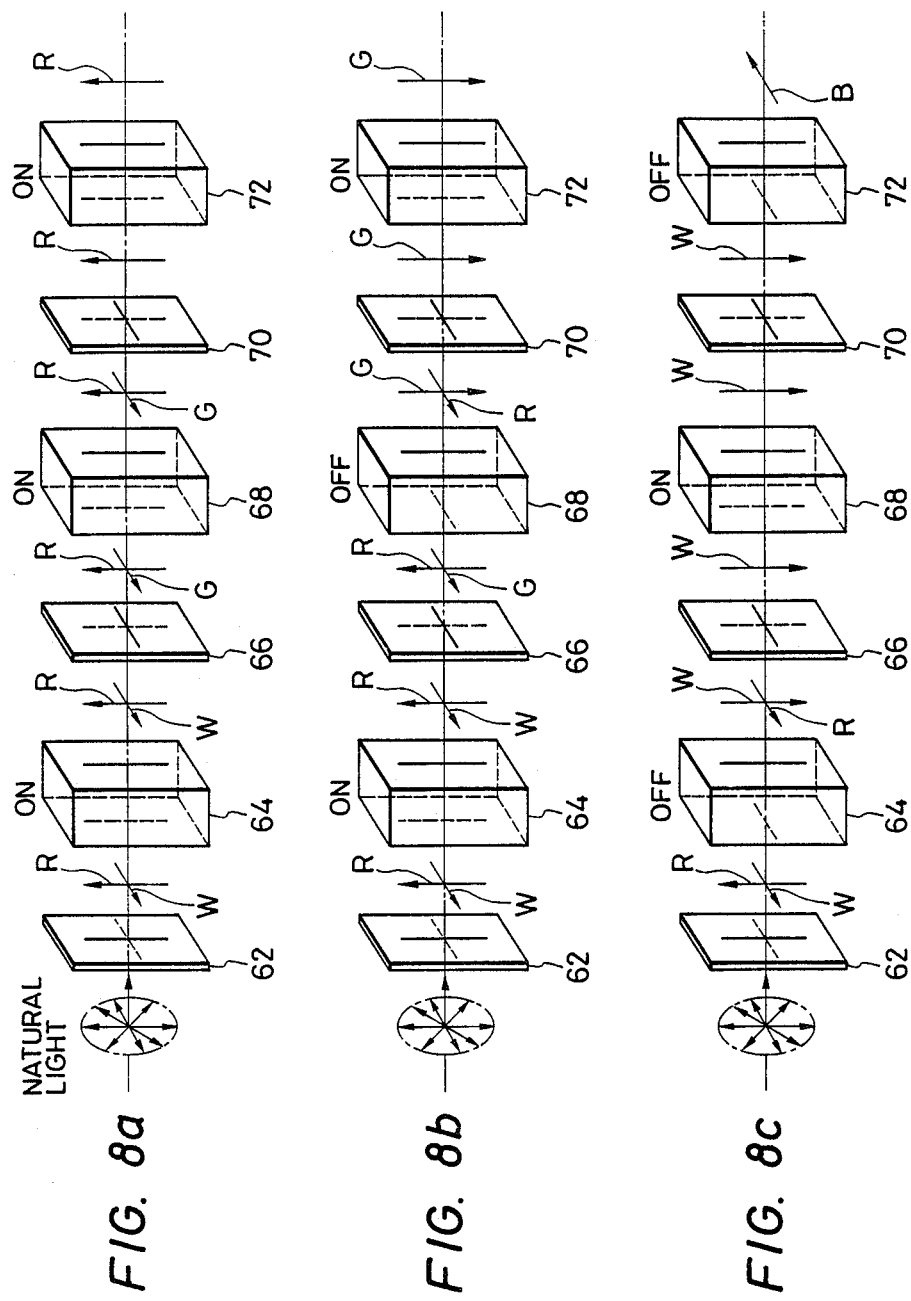

FIG. 9a

| COLOR TO BE REPRODUCED | LIQUID CRYSTAL CELLS | | | |
|---|---|---|---|---|
| | 32 (TN) | 40 (TN) | 50 (TN) | 60 (TN/GH) |
| RED | ON | OFF | OFF | ON |
| GREEN | OFF | ON | ON | ON |
| BLUE | OFF | OFF | OFF | OFF |
| YELLOW | ON/OFF | OFF/ON | OFF/ON | ON |
| MAGENTA | ON/OFF | OFF | OFF | ON/OFF |
| CYAN | OFF | ON/OFF | ON/OFF | ON/OFF |
| WHITE | OFF | OFF | OFF | ON |
| BLACK | OFF | OFF | ON | ON |

1ST PLZR: RED, 2ND PLZR: GREEN, TN/GH: BLUE

FIG. 9b

| COLOR TO BE REPRODUCED | LIQUID CRYSTAL CELLS | | |
|---|---|---|---|
| | 64 (TN) | 68 (TN) | 72 (TN/GH) |
| RED | ON | ON | ON |
| GREEN | ON | OFF | ON |
| BLUE | OFF | ON | OFF |
| YELLOW | ON | ON/OFF | ON |
| MAGENTA | ON/OFF | ON | ON/OFF |
| CYAN | ON/OFF | OFF/ON | ON/OFF |
| WHITE | OFF | ON | ON |
| BLACK | OFF | OFF | ON |

1ST PLZR: RED, 2ND PLZR: GREEN, TN/GH: BLUE

FIG. 9c

| | | LIQUID CRYSTAL CELLS | | |
|---|---|---|---|---|
| | | 76 (TN/GH) | 78 (TN) | 82 (TN) |
| COLOR TO BE REPRODUCED | RED | ON | OFF | ON |
| | GREEN | ON | ON | ON |
| | BLUE | OFF | OFF | OFF |
| | YELLOW | ON | OFF/ON | ON |
| | MAGENTA | ON/OFF | OFF | ON/OFF |
| | CYAN | ON/OFF | ON/OFF | ON/OFF |
| | WHITE | ON | ON | OFF |
| | BLACK | OFF | ON | OFF |

TN/GH: BLUE, 2ND PLZR: RED, 3RD PLZR: GREEN

FIG. 9d

| | | LIQUID CRYSTAL CELLS | | | |
|---|---|---|---|---|---|
| | | 88 (TN) | 92 (TN/GH) | 94 (TN/GH) | 96 (TN) |
| COLOR TO BE REPRODUCED | RED | OFF | ON | ON | OFF |
| | GREEN | ON | OFF | ON | OFF |
| | BLUE | ON | ON | OFF | OFF |
| | YELLOW | OFF/ON | ON/OFF | ON | OFF |
| | MAGENTA | OFF/ON | ON | ON/OFF | OFF |
| | CYAN | ON | OFF/ON | ON/OFF | OFF |
| | WHITE | ON | ON | ON | OFF |
| | BLACK | ON | ON | ON | ON |

1ST PLZR: RED, TN/GH (92): GREEN, TN/GH (94): BLUE

○ PRESENT INVENTION (FIG. 3)
□ PRIOR ART (FIG. 1a)
△ PRIOR ART (FIG. 1b)
● CRT
× STANDARD C SOURCE

PROJECTOR USING GUEST-HOST LIQUID CRYSTAL CELLS FOR IMPROVED COLOR PURITY

BACKGROUND OF THE INVENTION

1. Field of the Invention

The present invention relates to a projector using liquid crystal cells, and more particularly to a color projector with an arrangement of polarizers and liquid crystal cells which are aligned on an axis of light to be projected.

2. Description of the Related Art

Conventionally, a color projector had three black and white cathode-ray tubes (CRTs). Each CRT reproduces an image for one primary color. The images reproduced by the three CRTs are colored by dichroic mirrors in three primary colors, respectively. Thereafter they are projected on a screen through a projection lens to realize the full-color reproduction of an image. In such a conventional apparatus, however, the CRT did not have the sufficient brightness for projection on a large-sized screen and in addition, the size of the apparatus was considerably large, because three CRTs were used. Also, the apparatus was very expensive.

In order to make an apparatus small in its size and low in its price, various kinds of projectors using liquid crystal cells have been proposed. As shown in FIG. 1a, for example, a typical one thereof uses a neutral polarizer 2 and three Guest-Host type liquid crystal cells 4, 6, 8, which are colored in cyan, magenta and yellow, respectively. They are aligned on an axis of light to be projected. In this example, as apparent from the selection of color of the cells, the full-color reproduction was realized by a so-called subtractive mixture of color.

However, a colored image reproduced by this apparatus was low in the excitation purity of color and has no sufficient brightness. In addition, the scope of the color reproduction was narrow. These problems results mainly from the fact that the subtractive mixture of color was adopted for reproducing a color image.

Another example of the proposed projectors is, as shown in FIG. 1b, one using three colored pleochroic polarizers 10, 14, 18, three twisted nematic liquid crystal cells 12, 16, 20 and a netural polarizer 22. The three pleochroic polarizers are colored in red, green and blue which are three primary colors in a so-called additive mixture of color.

According to this example, the brightness of a reproduced image is improved because of the adoption of the additive mixture of color. At present, however, it is very difficult to get, at a low price, colored pleochroic polarizers for all the three colors, which have necessary color characteristics, such as dichroic ratio, brightness etc.. If polarizers having excellent color characteristics are used for the three colors in order to obtain a reproduction of an image with the high excitation purity and the sufficient brightness, an apparatus will become considerably expensive. In addition, although the primary colors of red, green and blue can be easily reproduced, the driving control of liquid crystal cells becomes somewhat complicated when cyan, magenta and yellow are reproduced.

SUMMARY OF THE INVENTION

An object of the present invention is to provide an economical projector using liquid crystal cells, which is capable of reproducing an image in a full color with the high excitation purity and the sufficient brightness and has the wide scope of the color reproduction.

A feature of the present invention is that, in an arrangement of polarizers and liquid crystal cells of a projector, at least one of the liquid crystal cells is of a Guest-Host type and colored in a color selected from among the three primary colors of an additive mixture, at least one of the polarizers is a color polarizer colored in a color selected from the remaining colors, and a total number of the Guest-Host cell and the color polarizer is three, each of which is colored in a different one of the three primary colors.

According to an embodiment of the present invention, there are used a single Guest-Host type liquid crystal cell, which is colored in one of the three primary colors, and two color polarizers, which are colored in the remaining two of the three primary colors, respectively.

In another embodiment of the present invention, there are employed a single polarizer which is colored in one of the three primary colors and two Guest-Host type liquid crystal cells, which are colored in the remaining two of the three primary colors, respectively.

BRIEF DESCRIPTION OF THE DRAWINGS

FIGS. 4a to 4e are drawings for explaining the operational principle of color reproduction in the arrangement of the example of FIG. 3;

FIGS. 8a to 8e are drawings for explaining the operational principle of color reproduction in the arrangement of the example of FIG. 5;

FIGS. 9a to 9d are tables summarizing the relationship between colors to be reproduced and the excitation states of liquid crystal cells in the arrangements of the examples of FIGS. 3, 5, 6 and 7;

DESCRIPTION OF THE PREFERRED EMBODIMENTS

Figure 2:
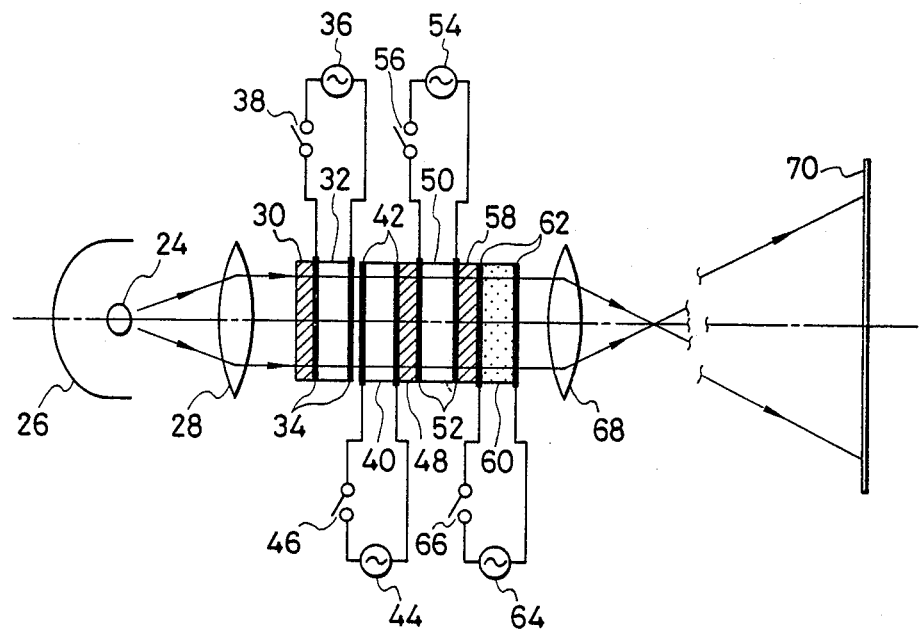
FIG. 2 schematically shows an overall configuration of a projector in accordance with an embodiment of the present invention.

Referring to FIG. 2, an overall configuration of a projector according to an embodiment of the present invention will be explained.

In the figure, reference numeral 24 denotes a light source. A source such as a xenon lamp, a halogen lamp etc. is preferable for the light source 24, because, in such light sources, the relative spectral energy distribution has the continuous spectrum in the wavelength region of the visible light, which is almost the same as that of the solar light. The light source 24 has a reflector 26 for the purpose of effectively using the entire light emitted from the source 24.

The light emitted from the source 24 is converted into a parallel ray of light by a collimating lens 28. The collimated ray of light passes through polarizers and liquid crystal cells arranged according to the present invention. These polarizers and liquid crystal cells are arranged as follows. There are positioned, at first, a first polarizer 30 which is a colored pleochroic polarizer (simply called a color polarizer, hereinafter) and, in contact therewith, a first liquid crystal cell 32 which is a twisted nematic liquid crystal cell (abbreviated as a TN cell, hereinafter).

As is well known, the TN cell 32 has transparent matrix electrodes 34 on both sides thereof, across which AC voltage is applied from an electric source 36 under control of a switch 38. Although a single switch is shown in the drawing, the switch 38 consists of unit switches of the number corresponding to the number of elements of the matrix electrodes 34. Those unit switches are controlled by a video signal for an image to be reproduced in one of the three primary colors. As a result, portions of the liquid crystal cell, which are put between the corresponding elements of both the matrix electrodes 34, are selectively excited. Further, the unit switches are usually formed on the same substrate as the liquid crystal cell and the electrodes.

In contact with the first liquid crystal cell 32, there is provided a second liquid crystal cell 40, which is also a TN cell. The TN cell 40 has transparent electrodes 42 on both sides thereof, across which AC voltage is applied by an electric source 44 through a switch 46. In the second cell 40, the electrode 42 are sufficient to be plane electrodes provided over the whole surface of both the sides of the cell 40. A second polarizer 48, which is a color polarizer, is positioned adjacent to the cell 40.

Further, there is provided a third liquid crystal cell 50, which is a TN cell. The TN cell 50 is provided with transparent matrix electrodes 52 on both sides thereof, across which AC voltage is applied by an electric source 54 under control of a switch 56. The matrix electrodes 52 and the switch 56 in this cell 50 are constructed in the same manner as those in the first cell 32. Unit switches of the switch 56 are controlled by a video signal for an image to be reproduced in another one of the three primary colors. Next to the third liquid crystal cell 50, there is provided a neutral polarizer 58.

Lastly, there is provided a fourth liquid crystal cell 60, which is a TN cell having the Guest-Host effect, in contact with the polarizer 58. Such a TN cell is abbreviated as a TN/GH cell, hereinafter. The TN/GH cell 60 has transparent matrix electrodes 62 on both sides thereof, across which AC voltage is applied by an electric source 64 under control of a switch 66. Also in the fourth cell 60, the matrix electrodes 62 and the switch 66 have the same construction as those in the first cell 32. Unit switches forming the switch 66 are controlled by a video signal for an image to be reproduced in the remaining one of the three primary colors.

The light which has passed the polarizers and the liquid crystal cells arranged as above is projected by a projection lens 68 to a screen 70, on which a colored and enlarged image is reproduced.

In the following, the arrangement of the polarizers and the liquid crystal cells will be explained more in detail, referring to FIG. 3. In the figure, the same reference numerals denote the same parts as in FIG. 2. Further, parts other than the polarizers and the liquid crystal cells are all omitted in the figure in order to facilitate the clear understanding of the arrangement thereof.

As already described, the first polarizer 30 is the color polarizer, which is colored in red. A solid line denoted by R on the polarizer 30 represents an absorption axis and a broken line denoted by R,G,B thereon a transmission axis. As is well known, light is linearly polarized when it passes the polarizer 30. At that time, although light having the polarization plane parallel with the axis R,G,B passes the polarizer 30 with its color unchanged, white light having the polarization plane parallel with the axis R is colored in red when it passes therethrough. Namely, in the light having the polarization plane parallel with the axis R, only a red component (component having the wavelength corresponding to red) can pass the polarizer 30 and other components, i.e., green and blue, are blocked.

The first liquid crystal cell 32 is the TN cell, and therefore, when no AC voltage is applied across the electrodes 34, light passing therethrough is subject to the rotary polarization of 90°. Incidentally, when no voltage is applied across the electrodes of a cell, it will be called hereinafter that the cell is in OFF state or that the excitation state of the cell is OFF. To the contrary, when AC voltage is applied across the electrodes 34, i.e. the cell 32 is in ON state, light passes the cell 32 without being subject to any rotary polarization. Since the second cell 40 is also the TN cell, the same as described above is applied thereto.

The second polarizer 48 is the color polarizer colored in green and the direction of an absorption axis G coincides with that of the absorption axis R of the first polarizer 30. Therefore, white light having the polarization plane parallel with the axis G is colored in green, when it passes the polarizer 48. The third polarizer 58 is the neutral polarizer, the absorption axis of which is at right angle with respect to the absorption axes R and G of the polarizers 30 and 48.

The TN/GH cell 60 is colored in blue. Therefore, when the TN/GH cell 60 is in OFF state, light passing therethrough is subject to the rotatory polarization of 90° and colored in blue. To the contrary, when the TN/GH cell 60 is in ON state, light passes therethrough without any rotary polarization, so that the color of the light is not changed.

In the arrangement described above, the fourth cell 60, which is the TN/GH cell, was colored in blue. However, the color of the TH/GH cell 60 is not limited to blue, but can be freely selected from among three primary colors. At that time, the colors of the two color polarizers 30 and 48 must be selected accordingly. If, for example, green is selected as a color of the TN/GH cell 60, red and blue are assigned to the respective color polarizers 30 and 48. For the arrangement as shown in FIG. 3, a total of six combinations of colors for the color polarizers 30 and 48 and the TN/GH cell 60 can be considered.

Referring to FIGS. 4a to 4e, the operational principle of the color reproduction in the arrangement of FIG. 3 will be explained in the following. In the figure, the same reference numerals denote the same parts as in FIG. 3.

FIG. 4a is a drawing for explaining the reproduction of red. Natural light, which is collimated by the lens 28, is emitted to the aforesaid arrangement of the polarizers and the liquid crystal cells from the left in the figure. When the light is emitted to the polarizer 30, it is linearly polarized so that two kinds of components thereof passes therethrough; one is red light, as denoted by R, having the polarization plane parallel with the absorption axis and the other is white light, as denoted by W, having the polarization plane parallel with the transmission axis.

Here, it is to be noted that arrows are attached to both the light having passed the polarizer 30 only for the purpose of facilitating the understanding of the effect of the rotary polarization in the liquid crystal cells. The same is applied to the following explanation.

The first cell 32 is maintained in ON state, and therefore the rotary polarization does not occur in this cell. This state is represented by solid and broken lines indicated in parallel with each other on both sides of the cell 32. Therefore, the light from the polarizer 30 passes the cell 32 without any change.

The second cell 40 is kept in OFF state. Therefore, the rotary polarization takes place in the light passing therethrough. This state is represented by solid and broken lines indicated at the relationship of right angle on both sides of the cell 40. Therefore, the light from the cell 32 i subject to the rotary polarization of 90° in this cell 40. This effect will be easily understood from the condition of the arrows attached to the light having passed through the cell 40.

White light from the cell 40 is colored in green by the polarizer 48, because its polarization plane is in parallel with the absorption axis of the polarizer 48 colored in green. Red light passes the polarizer 48 as it is, because its polarization plane is in parallel with the transmission axis of the polarizer 48. Therefore, the light having passed through the polarizer 48 contains green and red components, as shown in the figure.

The TN cell 50 is in OFF state, and therefore the light from the polarizer 48 is subject to the rotary polarization of 90° so that the polarization plane of a green component of the light from the cell 50 becomes parallel with the absorption axis of the polarizer 58. As a result, the green component is blocked by the polarizer 58, and only the red component passes therethrough, as shown in the figure.

Since the TN/GH cell 60, which is colored in blue, is made in ON state, the light from the polarizer 58 is not subject to any rotary polarization in the cell 60 and therefore passes therethrough without any change in color. As a result, when the light having passed the TN/GH cell 60 is projected to the screen 70, an image colored in red is reproduced thereon.

Referring next to FIG. 4b, the operational principle of the reproduction of a green image will be explained. In this case, as apparent from the figure, the polarization condition of the light having passed the second polarizer 48 is the same as that in the case of FIG. 4a. This results from the fact that, although there is the difference in the order of the excitation of the first and second cells 32 and 40 between FIGS. 4a and 4b, nevertheless the polarization plane of the polarized light is rotated only once.

Being different from the case of FIG. 4a, the third cell 50 is in ON state. Therefore, the light from the polarizer 48 passes the cell 50 without any rotary polarization. In two components of the light having passed the cell 50, a red component is blocked by the polarizer 58, because its polarization plane is in parallel with the absorption axis of the polarizer 58. Only a green component, the polarization plane of which is in parallel with the tranmmission axis of the polarizer 58, passes therethrough.

Since, similarly to the case of FIG. 4a the TN/GH cell 60 is in ON state, the light from the polarizer 58 passes the cell 60 without any rotary polarization and hence the change in the color. As a result, when the light having passed the cell 60 is projected by the projection lens 68, a image colored in green is reproduced on the screen 70.

In FIG. 4c, there is shown the operational principle of reproduction of blue. It will be understood from the foregoing explanation that the polarization condition of light from the cell 40 is by 90° different from that in FIG. 4b or 4a because the light from the polarizer 30 is rotated twice by 90° for every time. As a result, the red component in the light from the cell 40 is blocked by the polarizer 48, because its polarization plane is in parallel with the absorption axis thereof, and only the white component passes the polarizer 48, because its polarization plane is in parallel with the transmission axis thereof.

The light having passed the polarizer 48, which contains only the white component, is subject to the rotary polarization of 90° in the cell 50, which is in OFF state. The polarization plane of light having passed the cell 50 becomes in parallel with the transmission axis of the neutral polarizer 58, so that the light passes therethrough.

Since the TN/GH cell 60 is in OFF state, white light passing therethrough is rotated by 90° and colored in blue. Therefore, if the light having passed the cell 60 is projected by the projection lens 68, an image colored in blue is reproduced on the screen 70.

Figure 4D:
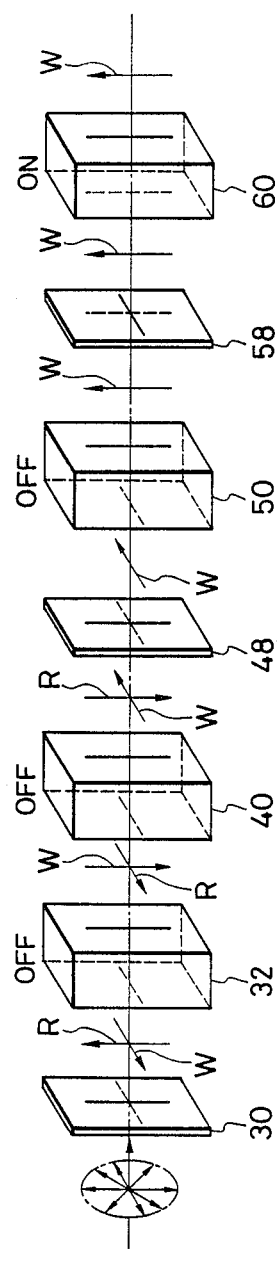
Figure 4E:
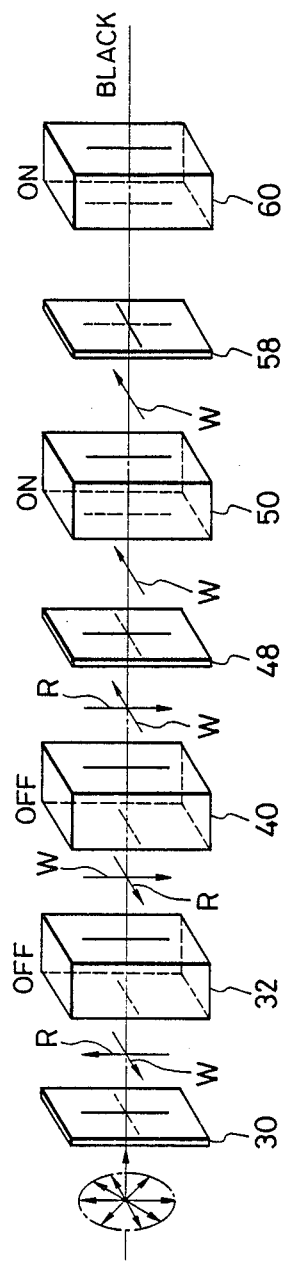

In FIGS. 4d and 4e, trhe reproduction of white and black is shown. However, the detailed explanation thereof is omitted for avoiding the redundant explanation. The operational principle thereof will be followed by referring to the foregoing explanation.

By the way, in order to realize the reproduction of an image in the full color, it is necessary to be capable of reproducing not only the primary colors in the additive mixture, i.e., red (R), green (G) and blue (B), but also those in the subtractive mixture, i.e., cyan (C), magenta (M) and yellow (Y).

Here it is to be noted that the following relations exist in six colors mentioned above;

$$G+B=W-R=C$$

$$B+R=W-G=M$$

$$R+G=W-B=Y$$

Therefore, cyan, magenta and yellow can be reproduced by using the operational principles for reproducing red, green and blue, in view of the aforesaid relationship.

For the purpose of reproduction of yellow, for example, the operations for reproducing red and green are combined. Namely, if the excitation state of the cells as shown in FIG. 4a and that as shown in FIG. 4b are repeated at predetermined frequencies, an image colored in red and an image colored in green are reproduced on the screen 70 alternately. From FIGS. 4a and 4b it will be understood that there is the difference in the excitation condition of the cells 32, 40 and 50. In this repetitive operation, therefore, only the cells 32, 40 and 50 are controlled intermittently and the cell 60 is maintained at ON state, during the reproduction of yellow.

Then, if the frequencies of the repetitive operation are selected at more than 30 Hz, human eyes can not see both images in distinction from each other, but only recognize a single yellow-colored image. Further, if the ratio of the duration of the state of FIG. 4a or 4b to the repetition period is changed, reddish or greeny yellow can be reproduced.

Similarly, on the basis of the above mentioned relationship, if the excitation states of FIGS. 4a and 4c are repeated at frequencies of more than 30 Hz, an image colored in magenta can be reproduced. If the ratio of the duration of the state of FIGS. 4a or 4c to the repetition period is changed, the reproduction of reddish or bluish magenta can be realized. Further, if the excitation states of FIGS. 4b and 4c are repeated, the reproduction of an image colored in cyan can be realized. Also in this case, if the ratio of the duration of the state of FIG. 4b or 4c to the repetition period is changed, it is possible to reproduce greeny or bluish cyan.

Figure 3:
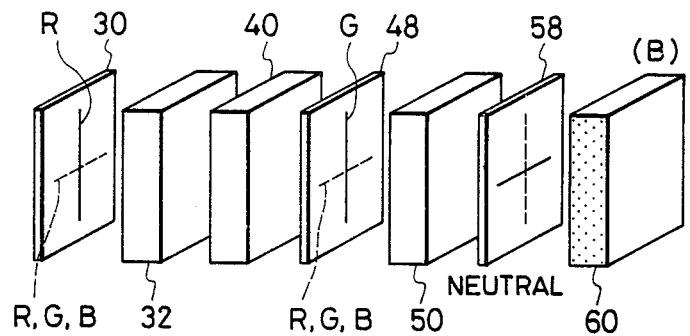
FIG. 3 is a view showing one example of an arrangement of polarizers and liquid crystal cells in the projector shown in FIG. 2.

In this manner, a full-color image can be reproduced by the arrangement of FIG. 3. The excitation state of the liquid crystal cells 32, 40, 50 and 60 in this embodiment is summarized in a table of FIG. 9a. In the table, the indications "ON/OFF" and "OFF/ON" mean that cells with these indications are subject to the repetitive operation of the intermittent excitation as described above.

In the following, some modifications of the combination of the polarizers and the liquid crystal cells will be explained, referring to FIGS. 5, 6 and 7.

Figure 5:
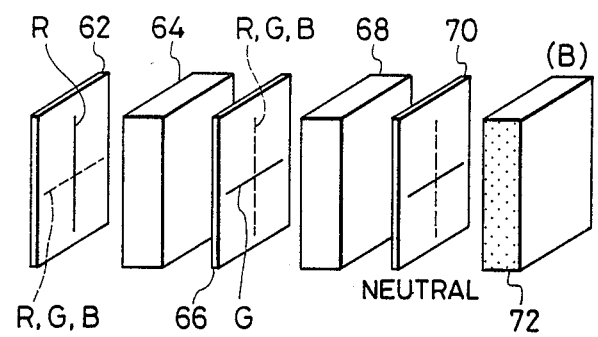
FIG. 5 shows a second example of the arrangement of polarizers and liquid crystal cells in the projector according to the present invention.

Referring first to FIG. 5, there is shown an example of an arrangement of polarizers and liquid crystal cells, in which two color polarizers 62, 66, two TN cells 64, 68, a neutral polarizer 70 and a TN/GH cell 72 are used. In this arrangement, one TN cell is less than in the arrangement of FIG. 3.

In FIG. 3, the TN cell 40 has no matrix electrodes and is used only for rotating the polarization plane of light passing therethrough. The red image, for example, is already produced by the cooperation of the polarizer 30 and the selective excitation of the matrix electrodes of the cell 32. In FIG. 5, the function achieved by the two TN cells 32 and 40 in FIG. 3 is achieved by the single TN cell 64. Therefore, the cell 64 must be provided with the matrix electrodes on its both sides.

Similarly to the case of FIG. 3, the first polarizer 62 is colored in red and the second polarizer 66 in green. However, the absorption axis of the second polarizer 66 is at a right angle to that of the first polarizer 62. This difference in the direction of the absorption axis is because the TN cell 40 was omitted. The TN/GH cell 72 is colored in blue.

Further, the color of the TN/GH cell 72 is not limited to blue, but can be freely selected from among the three primary colors. The color of the polarizers must be selected in view of the color selected for the TN/GH cell. If green is determined for the TN/GH cell, the colors of the two color polarizers must be selected from red and blue, respectively. Therefore, the six combinations for the selection of colors for the polarizers and a TN/GH cell are considered.

The operational principles of reproduction of red, green, blue, white and black are shown in FIGS. 8a to 8e in the similar manner to FIGS. 4a to 4e. In the following, however, only the reproduction of red will be explained, referring to FIG. 8a, because of the similarity of the operation and hence the avoidance of the redundant explanation.

In FIG. 8a, when a natural light passes the polarizer 62, the light is converted into the light composed of a red component having the polarization plane parallel with he absorption axis of the polarizer 62 and a white component having the polarization plane parallel with the transmission axis thereof. Since the TN cell 64 is in ON state, the light from the polarizer 62 passes the cell 64 without any rotatory polarization.

Next, the light from the TN cell 64 passes the polarizer 66. At that time, a white component from the TN cell 64 is colored in green, because the polarization plane of the white component is in parallel with the absorption axis of the polarizer 66 colored in green. The red component, the polarization plane of which is in parallel with the transmission axis, passes the polarizer 66 without any change in color.

The TN cell 68 is maintained at ON state, and therefore the light from the polarizer 66 passes therethrough without any rotary polarization. Although the light having passed the TN cell 68 has two components of red and green, since the polarization plane of the green component is in parallel with the absorption axis of the neutral polarizer 70, it is blocked and only the red component, the polarization plane of which is in parallel with the transmission axis, passes the polarizer 70.

The TN/GH cell 72 is in ON state, and therefore the light from the polarizer 70 passes the cell 72 without any rotary polarization and hence any change in color. When the light having passed the TN/GH cell 72 is projected by the projection lens 68, an image colored in red can be reproduced on the screen 70.

Figures 8D, 8E:
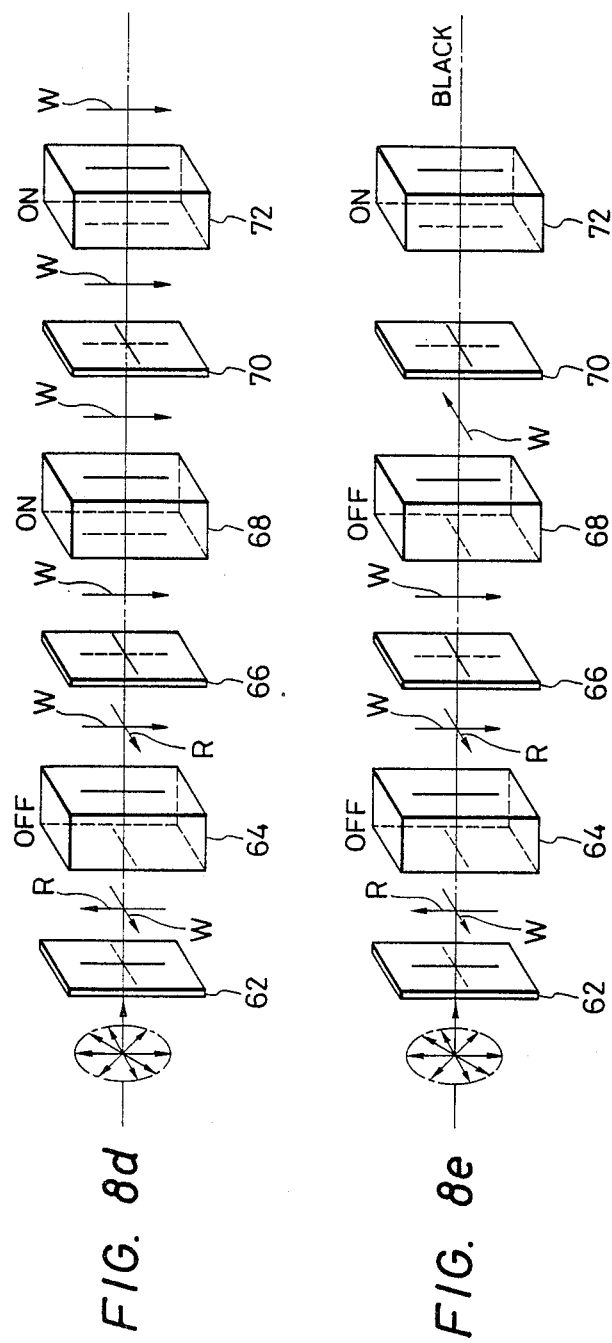

In the analogous way, green and blue can be reproduced as shown in FIGS. 8b and 8c, and also white and black can be reproduced as shown in FIGS. 8d and 8e. The excitation condition of the cells in the reproduction of these colors are summarized in a table of FIG. 9b. Also in this case, as will be understood from the table, yellow, magenta and cyan can be reproduced by repeatedly effecting two states purposively selected from among the states of FIGS. 8a to 8c.

Figure 6:
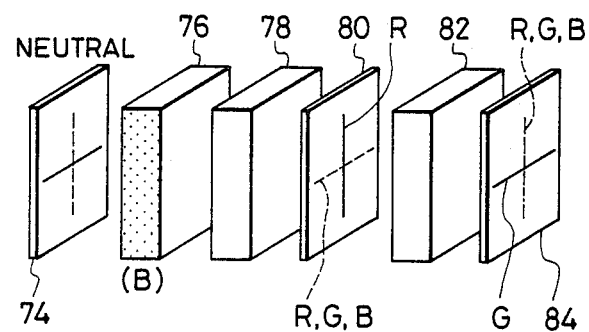
FIG. 6 shows a third example of the arrangement of polarizers and liquid crystal cells in the projector according to the present invention.

In FIG. 6 there is shown another example of an arrangement of polarizers and liquid crystal cells, in which a neutral polarizer 74, a TN/GH cell 76, two TN cells 78, 82 and two color polarizers 80, 84 are employed. Also in this example, all the cells must be provided with matrix electrodes on both sides of the respective cells in the similar manner to the case of FIG. 5. The TN/GH cell 76 is colored in blue, and the two color polarizers 80 and 84 are colored in red and green, respectively. Further, the absorption axes of the two color polarizers 80 and 84 are at a right angle to each other.

Similarly to the foregoing examples, the color of the TN/GH cell is not limited to blue, but can be freely selected from among the three primary colors. The colors of the two color polarizers must be selected, taking account of the color selected for the TN/GH cell. If green is determined for the TN/GH cell, the colors of the polarizers must be selected from red and blue, respectively. There is six combinations for the selection of colors for the polarizers and a TN/GH cell.

The excitation condition of the cells of this example is summarized in a table of FIG. 9c. Although there are not shown the operational principle of this example, it will be understood from the table of FIG. 9c and the analogy of the foregoing description that all the six colors and white and black can be reproduced.

Figure 7:
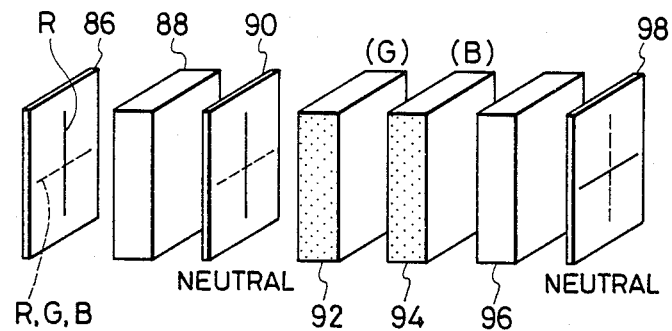
FIG. 7 shows a fourth example of the arrangement of polarizers and liquid crystal cells in the projector according to the present invention.

Still another example of an arrangement of polarizers and liquid crystal cells is shown in FIG. 7. In this example, there are employed a single color polarizer 86, two TN cells 88, 96, two neutral polarizers 90, 98 and two TN/GH cell 92, 94. A feature of this example which is different from the foregoing examples is in the use of the two TN/GH cells 92 and 94. The single color polarizer 86 is colored in red and both the TN/GH cells 92 and 94 are colored in green and blue, respectively.

Also in this case, the color of the TN/GH cells are not limited to green and blue, but can be freely selected from among the three primary colors. The color of the color polarizer must be selected in view of the colors selected for the TN/GH cells.

The excitation condition of the cells in this example is summarized in a table of FIG. 9d. Also with respect to this example, although there is not shown the operational principle, it will be understood from the table of FIG. 9d and the foregoing description that eight colors, i.e., red, green, blue, yellow, magenta, and cyan including white and black, can be reproduced.

Figure 1A:
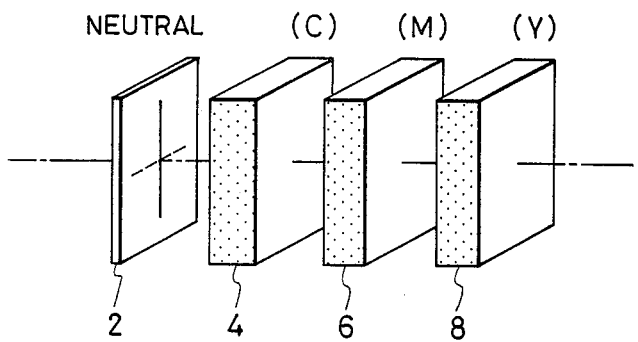
FIGS. 1a and 1b show arrangements of polarizers and liquid crystal cells in prior art projectors.
Figure 1B:
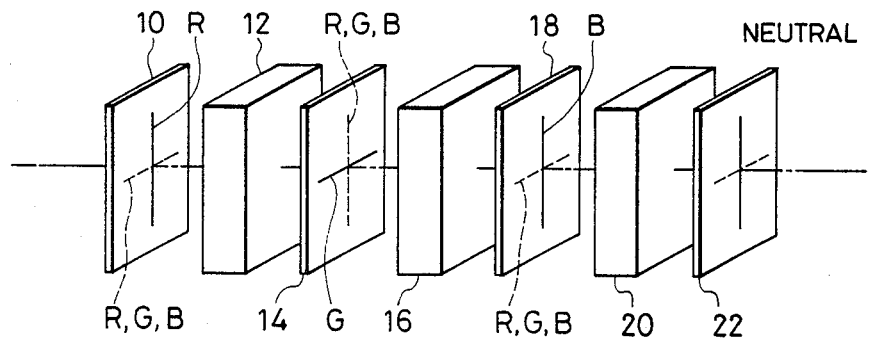

In the following, the effect of the present invention will be discussed, compared with the prior art. The arrangement of the polarizers and the liquid crystal cells shown in FIG. 3 is taken as an example of the present invention, and both the arrangements of FIGS. 1a and 1b are taken as examples of the prior art.

Figure 10:
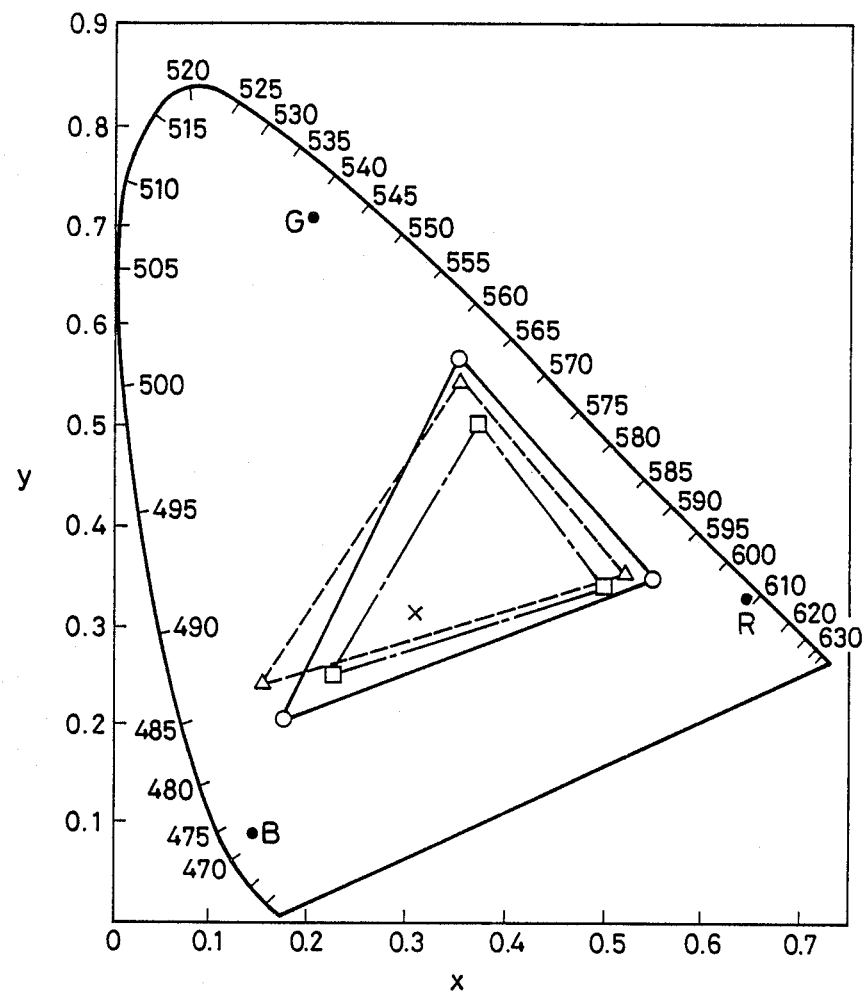
FIG. 10 is a diagram representing the effect of the present invention in the chromaticity coordinates, in which the scope of the color reproduction in the present invention is compared with that in the prior art of FIGS. 1a and 1b.

FIG. 10 is a known chromaticity diagram, in which coordinates of red, green and blue reproduced by the above mentioned three examples are indicated. The rightmost correspond to the coordinates of red and the leftmost to those of blue. The coordinates lying therebetween are of green. The area of triangles formed by these coordinates represent the scope of color which can be reproduced by the respective examples. As apparent from the diagram, the scope of the color reproduction of the present invention is considerably improved, compared with that of the prior art of FIG. 1a (cf. triangles of a solid line and a chain line in FIG. 10).

In this diagram, coordinates of red, green and blue reproduced by a color CRT in accordance with color signals in the NTSC system are indicated by black dots R, G and B, respectively. It is to be noted that they do not indicate coordinates of respective colors which are reproduced by a projector using CRTs. The scope of colors capable of actually being reproduced by a CRT type projector becomes smaller than that indicated by the black dots R, G and B, because it greatly depends on the characteristics and capabilities of dichroic mirrors used in the projector. From this diagram, it will be understood that the present invention reproduces colors which are closer to those reproduced by the color CRT, compared with two other examples. Further, a mark x indicates coordinates of a standard C source.

Figure 11:
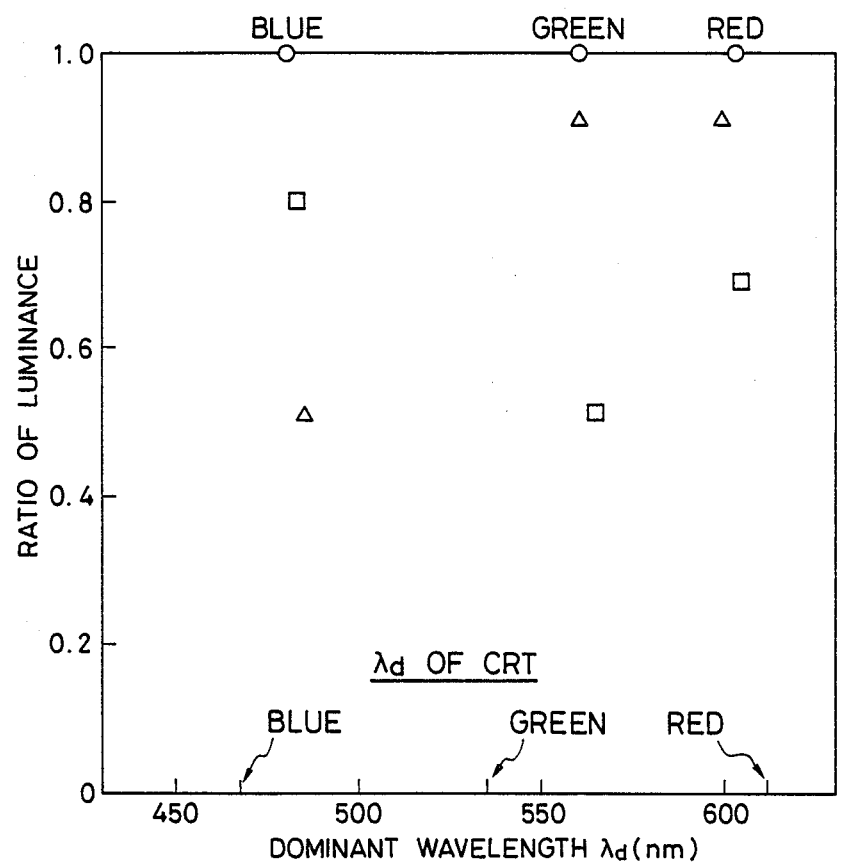
FIG. 11 is also a diagram representing the effect of the present invention, in which the brightness of colors reproduced by the present invention are compared with that by the prior art.

Referring next to FIG. 11, the comparison of the brightness of reproduced colors will be discussed. In the figure, an ordinate represents luminance of respective colors reproduced by the above mentioned three examples in term of the ratio when the value of the present invention is made 1.0. An abscissa thereof represents a dominant wavelength $\lambda_d$ of the respective colors. Marks indicative of respective values are the same as ones in FIG. 10. For the comparison, values of the dominant wavelength of respective colors reproduced by a color CRT are indicated on the abscissa.

As apparent from the figure, with respect to blue, for example, the present invention is about 20% brighter than the prior art of FIG. 1a and about 50% brighter than that of FIG. 1b. With respect to green, the present invention is about 50% brighter than the prior art of FIG. 1a and about 10% brighter than that of FIG. 1b. Further, with respect to red, the present invention is over 30% brighter than the prior art of FIG. 1a and about 10% brighter than that of FIG. 1b. In this manner, as a whole, the present invention is 10% to 50% superior in the brightness of the reproduced colors to every prior art.

We claim:
1. A projector having:
   a light source for generating white light for projection;
   means for collimating the white light generated by said light source;
   polarizer means, arranged on the axis of light, for linearly polarizing the collimated light passing therethrough;
   liquid crystal cell means arranged with the predetermined positional relationship with said polarizer means on the same axis of light and selectively excited or de-excited in accordance with video signals of an image to be reproduced to control the polarization plane of light passing therethrough; and
   means for projecting light having passed said polarizer means and said liquid crystal cell means to reproduce the image on a screen in a full color, characterized in
   that at least one of said liquid crystal cell means is a Guest-Host type cell which is colored in a color selected from among three primary colors of an additive mixture and the remaining liquid crystal cell means are non-colored twisted nematic liquid crystal cells;
   that at least one of said polarizer means is a color polarizer colored in a color selected from the remaining colors and the remaining polarizers are neutral polarizers; and
   that a total number of the Guest-Host cell and the color polarizer is three, each being colored in a different one of the three primary colors in the additive mixture.

2. A projector according to claim 1, wherein said polarizer means includes two color polarizers and said liquid crystal cell means includes a single Guest-Host type cell.

3. A projector according to claim 2, wherein one of the two color polarizers is colored in red, the other color polarizer is colored in either green or blue, and the Guest-Host cell is colored in the remaining color.

4. A projector according to claim 3, wherein the Guest-Host cell is colored in blue.

5. A projector according to claim 2, wherein said polarizer means and said liquid crystal cell means are arranged in the order of a first polarizer colored in a first one of the three primary colors, a first twisted nematic liquid crystal cell, a second twisted nematic liquid crystal cell, a second polarizer colored in a second one of the three primary colors, a third twisted nematic liquid crystal cell, a third polarizer which is neutral, and a fourth liquid crystal cell which is a Guest-Host type and colored in a third one of the three primary colors.

6. A projector according to claim 2, wherein said polarizer means and said liquid crystal cell means are constructed by an arrangement of polarizers and liquid crystal cells arranged in the order of a first polarizer colored in a first one of the three primary colors, a first twisted nematic liquid crystal cell, a second polarizer colored in a second one of the three primary colors, a second twisted nematic liquid crystal cell, a third polarizer which is neutral, and a third liquid crystal cell which is of a Guest-Host type and colored in a third one of the three primary colors.

7. A projector according to claim 2, wherein said polarizer means and said liquid crystal cell means are constructed by an arrangement of polarizers and liquid crystal cells arranged in the order of a first polarizer which is neutral, a first liquid crystal cell which is of a Guest-Host type and colored in a first one of the three primary colors, a second twisted nematic liquid crystal cell, a second polarizer colored in a second one of the three primary color, a third twisted nematic liquid crystal cell, and a third polarizer colored in a third one of the three primary colors.

8. A projector according to claim 1, wherein said polarizer means includes a single color polarizer and said liquid crystal cell includes two Guest-Host type cells.

9. A projector according to claim 1, wherein said polarizer means and said liquid crystal cell means are constructed by an arrangement of polarizers and liquid crystal cells arranged in the order of a first polarizer colored in a first one of the three primary colors, a first twisted nematic liquid crystal cell, a second polarizer which is neutral, a second liquid crystal cell which is of a Guest-Host type and colored in a second one of the three primary colors, a third liquid crystal cell which is of a Guest-Host type and colored in a third one of the three primary colors, a fourth twisted nematic liquid crystal cell, and a third polarizer which is neutral.

10. A projector having:
a light source for generating white light for projection;
means for collimating the white light generated by said light source;
three polarizer means for linearly polarizing the collimated light passing therethrough, two of said three polarizer means being color polarizers colored in two colors selected from among three primary colors of the additive color mixture, respectively, and the other of said three polarizer means being a neutral polarizer;
at least three liquid crystal cell means, selectively and repeatedly excited or de-excited in accordance with video signals of an image to be reproduced to control the polarization plane of light passing therethrough, one of said at least three liquid crystal cell means being a Guest-Host type cell colored in the remaining color of the three primary colors and the remaining liquid crystal cell means being noncolored twisted nematic liquid crystal cells;
said polarizer means and said liquid cell means being arranged on the same axis of light in such a positional relationship that, in response to the video signals, said liquid crystal cell means control the polarization plane of light incident on the color polarizers and Guest-Host type cell to color the light passing therethrough in a corresponding color; and
means for projecting the light having passed through said polarizer means and liquid crystal cell means to reproduce the image on a screen in full color.

11. A projector according to claim 10, wherein one of the two color polarizers is colored in red, the other color polarizer is colored in either green or blue, and the Guest-Host cell is colored in the remaining color.

12. A projector according to claim 11, wherein the Guest-Host cell is colored in blue.

13. A projector according to claim 10, wherein said polarizer means and said liquid crystal cell means are arranged in the order of a first polarizer colored in a first one of the three primary colors, a first twisted nematic liquid crystal cell, a second twisted nematic liquid crystal cell, a second polarizer colored in a second one of the three primary colors, a third twisted nematic liquid crystal cell, a third polarizer which is neutral, and a fourth liquid crystal cell which is a Guest-Host type and colored in a third one of the three primary colors.

14. A projector according to claim 10, wherein said polarizer means and said liquid crystal cell means are constructed by an arrangement of polarizers and liquid crystal cells arranged in the order of a first polarizer colored in a first one of the three primary colors, a first twisted nematic liquid crystal cell, a second polarizer colored in a second one of the three primary colors, a second twisted nematic liquid crystal cell, a third polarizer which is neutral, and a third liquid crystal cell which is of a Guest-Host type and colored in a third one of the three primary colors.

15. A projector according to claim 10, wherein said polarizer means and said liquid crystal cell means are constructed by an arrangement of polarizers and liquid crystal cells arranged in the order of a first polarizer which is neutral, a first liquid crystal cell which is of a Guest-Host type and colored in a first one of the three primary colors, a second twisted nematic liquid crystal cell, a second polarizer colored in a second one of the three primary colors, a third twisted nematic liquid crystal cell, and a third polarizer colored in a third one of the three primary colors.

16. A projector having:
a light source for generating white light for projection;
means for collimating the white light generated by said light source;
three polarizer means for linearly polarizing the collimated light passing therethrough, one of said three polarizer means being color polarizer colored in a color selected from among three primary colors of the additive color mixture and the other two polarizer means being neutral polarizers;
four liquid crystal cell means, selectively and repeatedly excited or de-excited in accordance with video signals of an image to be reproduced to control the polarization plane of light passing therethrough, two of said four liquid crystal cell means being Guest-Host type cells colored in the remaining two colors of the three primary colors, respectively, and the remaining two of said four liquid crystal cell means being noncolored twisted nematic liquid crystal cells;

said polarizer means and liquid crystal cell means being arranged on the same axis of light in such a positional relationship that, in response to the video signals, said liquid crystal cell means control the polarization plane of light incident on the color polarizer and Guest-Host type cells to color the light passing therethrough in a corresponding color; and means for projecting the light having passed through said polarizer means and liquid crystal cell means to reproduce the image on a screen.

17. A projector according to claim 16, wherein said polarizer means and said liquid crystal cell means are constructed by an arrangement of polarizers and liquid crystal cells arranged in the order of a first polarizer colored in a first one of the three primary colors, a first twisted nematic liquid crystal cell, a second polarizer which is neutral, a second liquid crystal cell which is of a Guest-Host type and colored in a second one of the three primary colors, a third liquid crystal cell which is of a Guest-Host type and colored in a third one of the three primary colors, a fourth twisted nematic liquid crystal cell, and a third polarizer which is neutral.

* * * * *